United States Patent
Anno

(10) Patent No.: US 11,831,829 B2
(45) Date of Patent: Nov. 28, 2023

(54) IMAGE CONTROL APPARATUS RECEIVING SHUTDOWN INSTRUCTION AND METHOD FOR CONTROLLING THE SAME

(71) Applicant: CANON KABUSHIKI KAISHA, Tokyo (JP)

(72) Inventor: Makoto Anno, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/932,614

(22) Filed: Sep. 15, 2022

(65) Prior Publication Data
US 2023/0100870 A1    Mar. 30, 2023

(30) Foreign Application Priority Data
Sep. 28, 2021    (JP) .................. 2021-157491

(51) Int. Cl.
*H04N 1/00* (2006.01)
*G06F 3/12* (2006.01)
*G03G 15/00* (2006.01)

(52) U.S. Cl.
CPC ..... *H04N 1/00928* (2013.01); *G03G 15/5004* (2013.01); *G06F 3/1236* (2013.01); *H04N 2201/0039* (2013.01)

(58) Field of Classification Search
CPC .................................. H04N 1/00928
USPC ....................................... 358/1.14
See application file for complete search history.

(56) References Cited

U.S. PATENT DOCUMENTS

| 10,728,412 B2 | 7/2020 | Sasagawa | |
| 2015/0055181 A1* | 2/2015 | Ooba | G06F 3/1236 358/1.15 |
| 2017/0337018 A1* | 11/2017 | Ooba | G06F 3/121 |
| 2019/0356803 A1* | 11/2019 | Sasagawa | H04N 1/00973 |
| 2020/0314281 A1 | 10/2020 | Sasagawa | |

FOREIGN PATENT DOCUMENTS

JP    2019201323 A    11/2019

* cited by examiner

*Primary Examiner* — Jacky X Zheng
(74) *Attorney, Agent, or Firm* — Canon U.S.A., Inc. IP Division

(57) ABSTRACT

An image control apparatus connected to an image forming apparatus through a network includes one or more controllers having one or more processors and one or more memories. The one or more controllers are configured to receive, through a network, a shutdown instruction issued to the image forming apparatus, and determine whether the image forming apparatus is connected to a second network other than a first network through which the image forming apparatus is connected to the image control apparatus. When the one or more controllers determine that the image forming apparatus is connected to the second network other than the first network, the one or more controllers do not issue the shutdown instruction to the image forming apparatus even when the one or more controllers receive the shutdown instruction through the network.

16 Claims, 11 Drawing Sheets

FIG. 4A
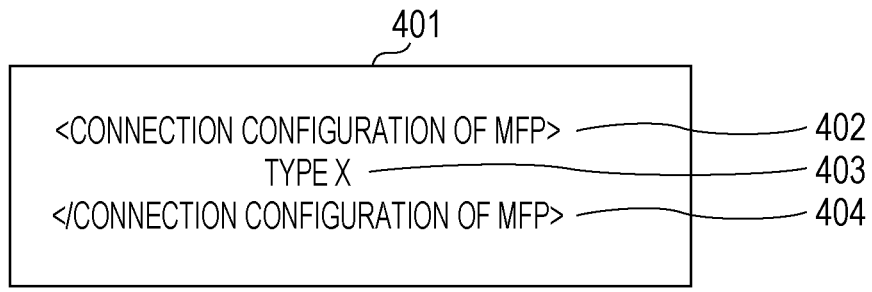
FIG. 4B
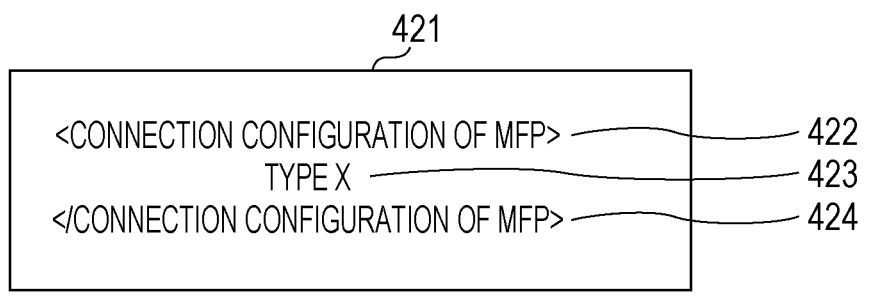
FIG. 4C
|  | TYPE 1 | TYPE 2 |
|---|---|---|
| FIRST COMMUNICATION UNIT | DFE | DFE |
| SECOND COMMUNICATION UNIT | NONE | NETWORK 100 |

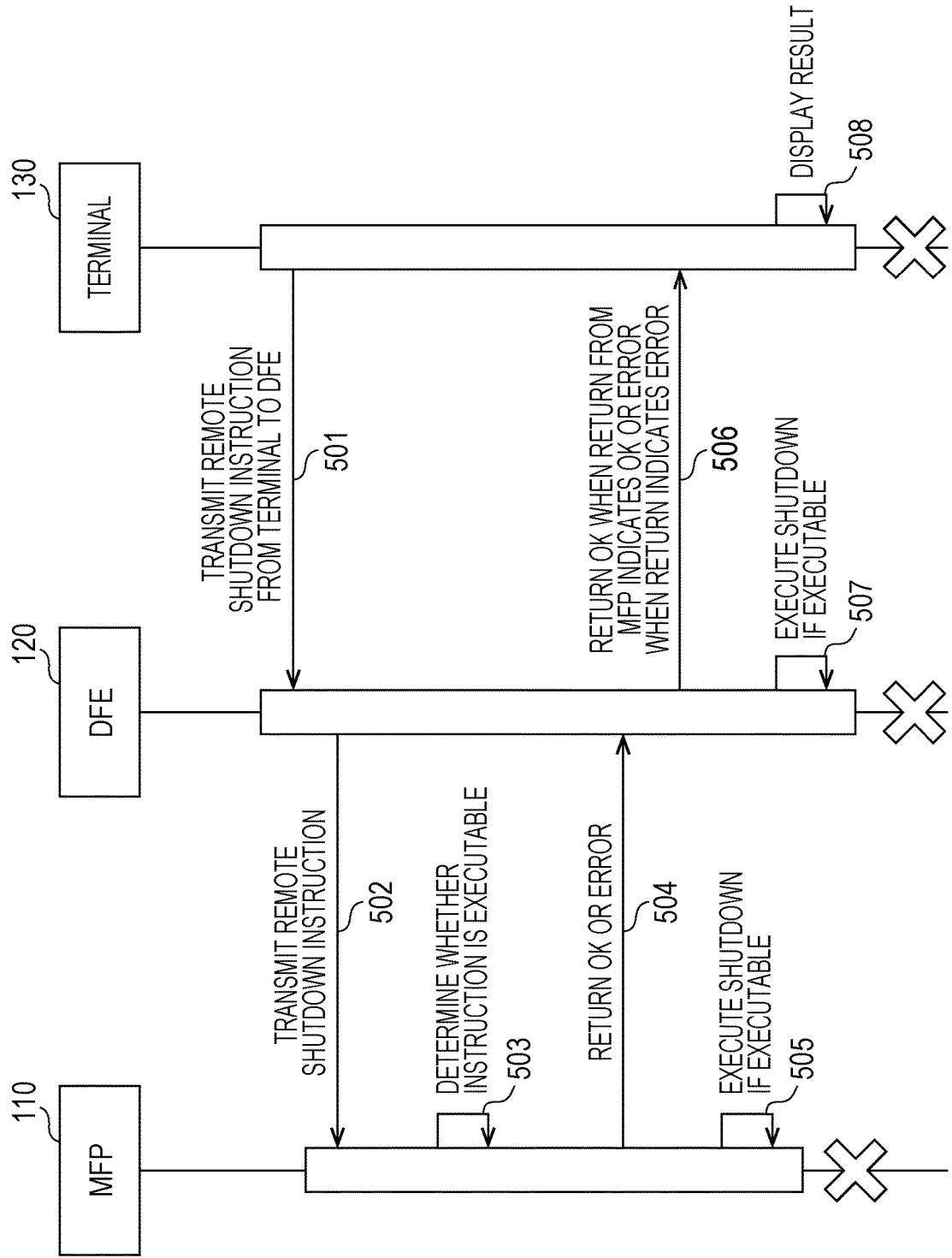

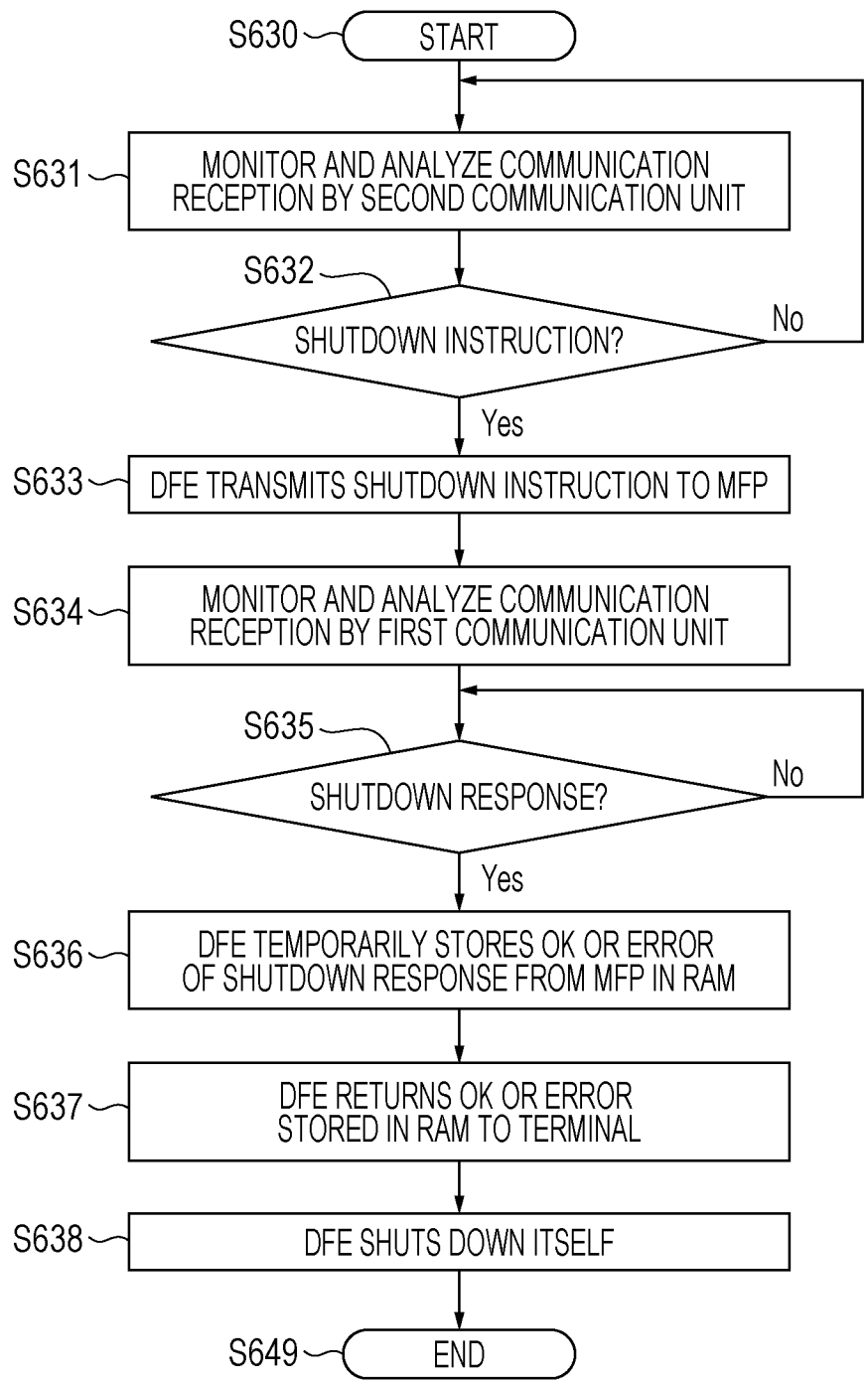

IMAGE CONTROL APPARATUS RECEIVING SHUTDOWN INSTRUCTION AND METHOD FOR CONTROLLING THE SAME

BACKGROUND

Field of the Disclosure

The present disclosure relates to an image control apparatus that receives a shutdown instruction and a method for controlling the image control apparatus.

Description of the Related Art

Examples of a method for causing a printer or a multifunction peripheral having a copy function as the core function to enter a power-off state or to enter a deep sleep state in which power consumption is suppressed as much as possible include a method for causing the printer or the multifunction peripheral to enter such a state when any of operations including printing is not performed for a predetermined period of time and a method for causing the printer or the multifunction peripheral to enter such a state when a time set by a timer has reached. In addition, a technique of remotely causing a printer or a multifunction peripheral to enter a power-off state or a deep sleep state, which is referred to as remote shutdown or a remote power saving setting, has been used.

Here, a device referred to as a print controller may be connected to a printer or a multifunction peripheral to expand and improve print processing capability, functions, and usability of the printer or the multifunction peripheral. Such a print controller is connected to a printer or a multifunction peripheral via a network, a dedicated line, or the like. Therefore, when transition to a power-off state or a deep sleep state is to be remotely performed, the following sequence is performed. That is, a personal computer (PC) transmits an instruction to a print controller so that the print controller issues an instruction for entering a power-off state or a deep sleep state to the printer or the multifunction peripheral, the print controller itself is turned off or enters a deep sleep state after the printer or the multifunction peripheral is turned off or enters a deep sleep state, and thereafter, the print controller transmits a reply to the PC that has issued the instruction.

Japanese Patent Laid-Open No. 2019-201323 discloses the following method. That is, when a printer or a multifunction peripheral that has a FAX line other than a network receives a remote shutdown instruction through the network and is in a state in which data is transmittable and receivable through the FAX line, shutdown is not performed.

SUMMARY

The present disclosure provides an image control apparatus connected to an image forming apparatus through a network. The image control apparatus includes one or more controllers having one or more processors and one or more memories. The one or more controllers are configured to receive, through a network, a shutdown instruction issued to the image forming apparatus, and to determine whether the image forming apparatus is connected to a second network other than a first network through which the image forming apparatus is connected to the image control apparatus. When the one or more controllers determine that the image forming apparatus is connected to the second network other than the first network through which the image forming apparatus is connected to the image control apparatus, the one or more controllers do not issue the shutdown instruction to the image forming apparatus even when the one or more controllers receive the shutdown instruction through the network.

Further features of various embodiments will become apparent from the following description of exemplary embodiments with reference to the attached drawings.

BRIEF DESCRIPTION OF THE DRAWINGS

FIG. 4A is a diagram illustrating first type setting data, FIG. 4B is a diagram illustrating second type setting data, FIG. 4C is a diagram illustrating third type setting data.

FIG. 5 is a sequence diagram.

FIG. 6B is a flowchart in a second mode.

DESCRIPTION OF THE EMBODIMENTS

An embodiment of the present disclosure will be described.

Hereinafter, an embodiment of the present disclosure will be described in detail with reference to the accompanying drawings. Note that the following embodiment does not limit the present disclosure associated with the claims, and it is not necessarily the case that all combinations of characteristics described in the embodiment are required for solving means of the present disclosure.

Figure 1A:
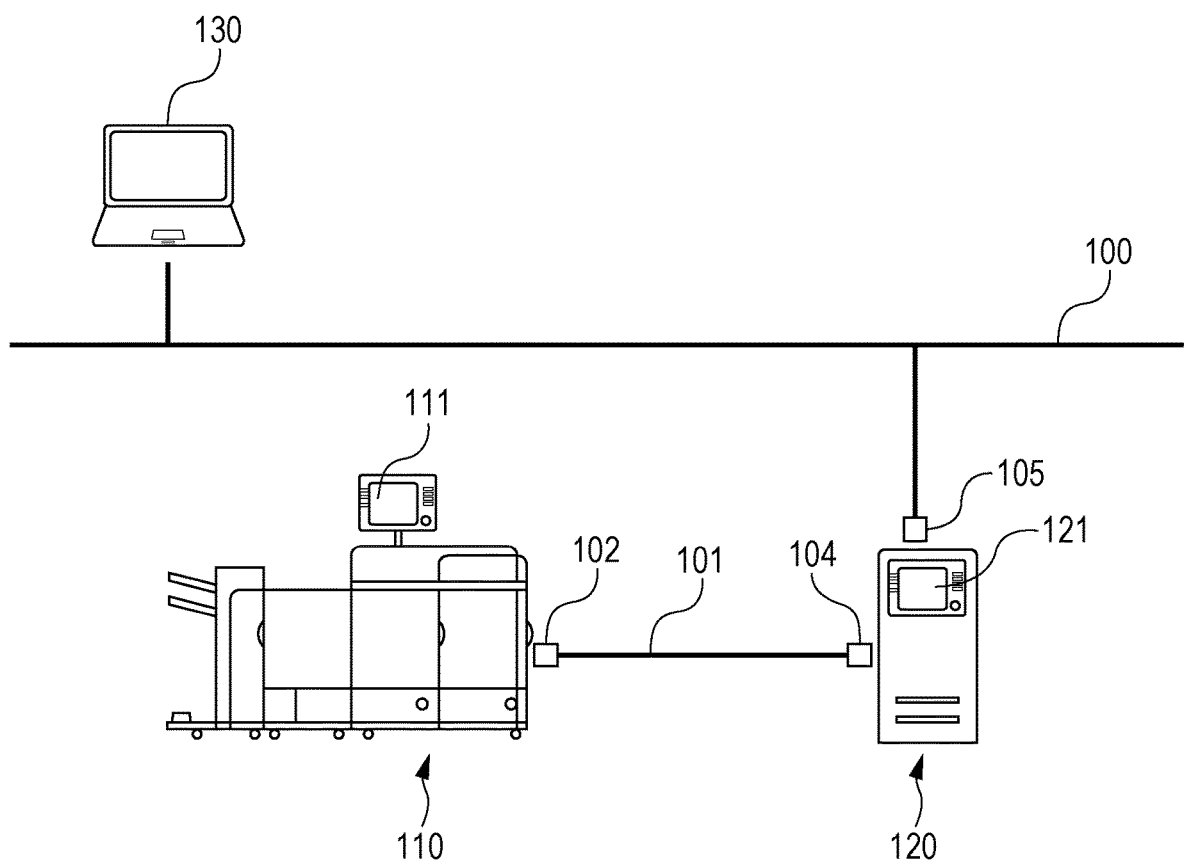
FIG. 1A is a diagram illustrating a network configuration in a first mode.
Figure 1B:
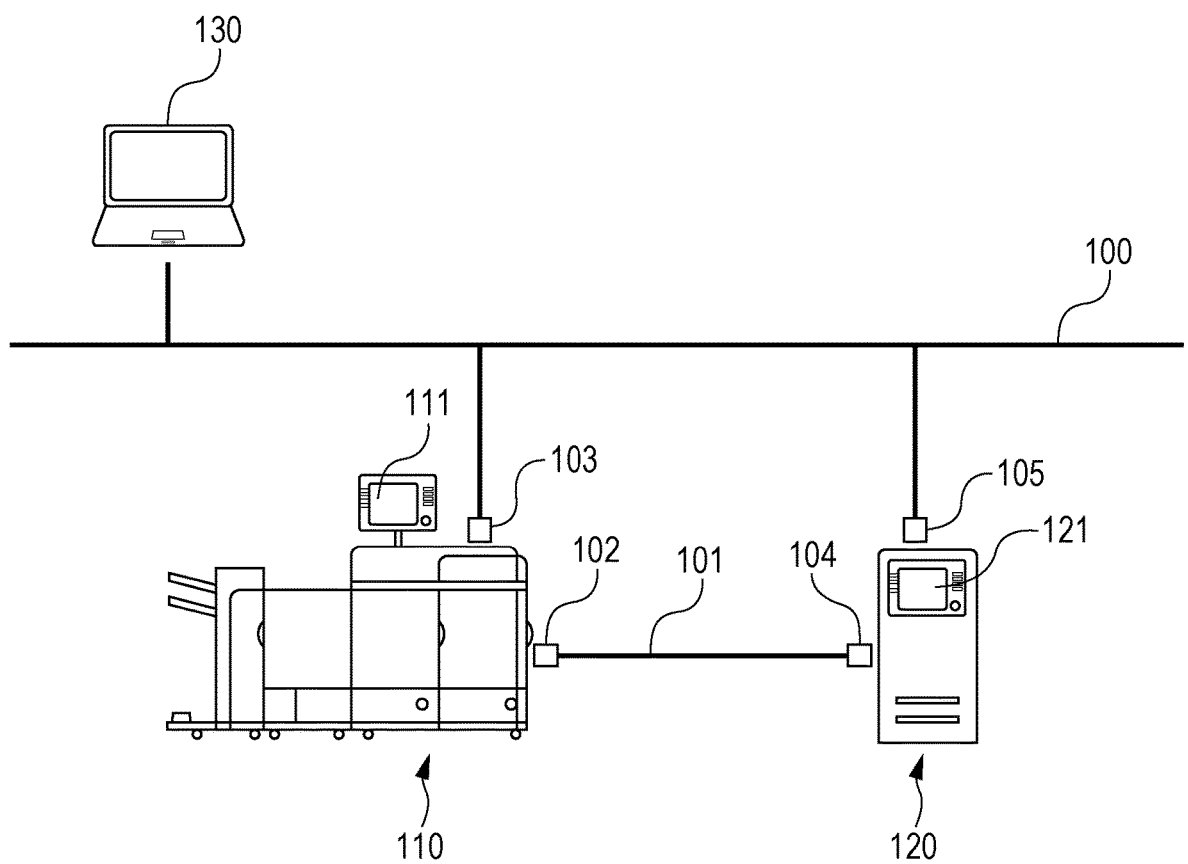
FIG. 1B is a diagram illustrating a network configuration in a second mode.

FIGS. 1A and 1B

FIG. 1A is a diagram illustrating a configuration of a print system according to this embodiment.

The printer or the multifunction peripheral having a copy function as the core function described as the background technique is referred to as a multi-function peripheral (MFP) in the following description and is denoted by 110 in FIG. 1A. Similarly, the print controller is referred to as a digital front end (DFE) in the following description, and is denoted by 120 in FIG. 1A. The DFE 120 has a port 105 of a network represented by 1 Gbit Ethernet, and is connected to a network 100. The DFE 120 further has a port 104, in addition to the port 105, for a network represented by 1 Gbit Ethernet or for a high-speed communication line represented by HDMI® or a Universal Serial Bus (USB) to be connected to the MFP 110. Similarly, the MFP 110 has a port 102 for a network represented by 1 Gbit Ethernet or for a high-speed communication line represented by HDMI or a USB to be connected to the DFE 120. The MFP 110 and the DFE 120 are connected to each other through the network or a high-speed communication line 101. The network 100 connected to the port 105 of the DFE 120 is an office network or an intranet, and terminals including PCs and servers are connected to the network 100. The PCs and the servers are represented as a terminal 130 in FIG. 1A. Note that smartphones, such as an iPhone® of Apple Inc., may be connected to the network 100 through Wi-Fi and are also an example of the terminal 130. The MFP 110 includes an operation unit 111, and the DFE 120 includes an operation unit 121.

FIG. 1A is a diagram illustrating a configuration as described in the background technique in which, although the MFP 110 and the DFE 120 are different apparatuses, the MFP 110 and the DFE 120 are regarded as an integrated system in terms of functions when viewed from the terminal 130 on the network 100. Specifically, the MFP 110 is not directly connected to the network 100, and the DFE 120 is positioned between the MFP 110 and the network 100.

In the integrated system configuration, when functions of the MFP 110 are to be used through the DFE 120, the DFE 120 is required to mediate the functions.

Specifically, the DFE 120 realizes mediation by transferring a communication protocol between the terminal 130 and the MFP 110 by a network technique referred to as network address translation (NAT) or by converting a communication protocol with the terminal 130 to a communication protocol with the MFP 110. However, this mediation technique may not cope with all protocols. In particular, when a data section is encrypted in an encryption communication or an IPv6 communication, the DFE 120 may not convert the data section. Therefore, it is disadvantageous for the integrated system that some of the functions of the MFP 110 may not be used through the DFE 120. Accordingly, to enable use of all the functions of the MFP 110, a configuration in which the MFP 110 has a network that is other than the network or the dedicated line connected to the DFE 120 and that is directly connected to the PC has been proposed. However, the configuration may not have versatility. Some of the functions that are usable in a general configuration may conversely be unavailable due to processing capability and a complicated configuration of the MFP 110. Therefore, two types of connection configurations, that is, an integrated type and a direct connection type, are prepared as connection configurations between the MFP 110 and the DFE 120, and one of the types is selected in accordance with usage of a user.

On the other hand, FIG. 1B is a diagram illustrating a configuration in which the MFP 110 is directly connected to the network 100. The MFP 110 has a port 103 of a network represented by 1 Gbit Ethernet in addition to the port 102 for the network or the high-speed communication line, and the port 103 is connected to the network 100.

With the configuration in which the MFP 110 is directly connected to the terminal 130 through the other network, the MFP 110 may communicate with the terminal 130 in addition to communication from the DFE 120. For example, different types of use may be employed such that printing is performed through the DFE 120 capable of processing a complicated work flow due to its high processing capability, whereas functions of FAX, BOX, and the like that are provided in the multifunction peripheral are performed through direct connection to the multifunction peripheral. In this way, some users mainly use the DFE 120 and the others mainly use the MFP 110 directly. In this case, there arises a problem in that, in a case where remote shutdown is executed when a user who mainly uses the DFE 120 terminates the use of the DFE 120, the MFP 110 is also turned off as described above, and therefore, when another user is directly using a scan function, a FAX function, a BOX function, or the like of the MFP 110, the operation is interrupted.

Hereinafter, a description is made while reference numerals 101, 102, and 104 denote a network.

Figure 2A:
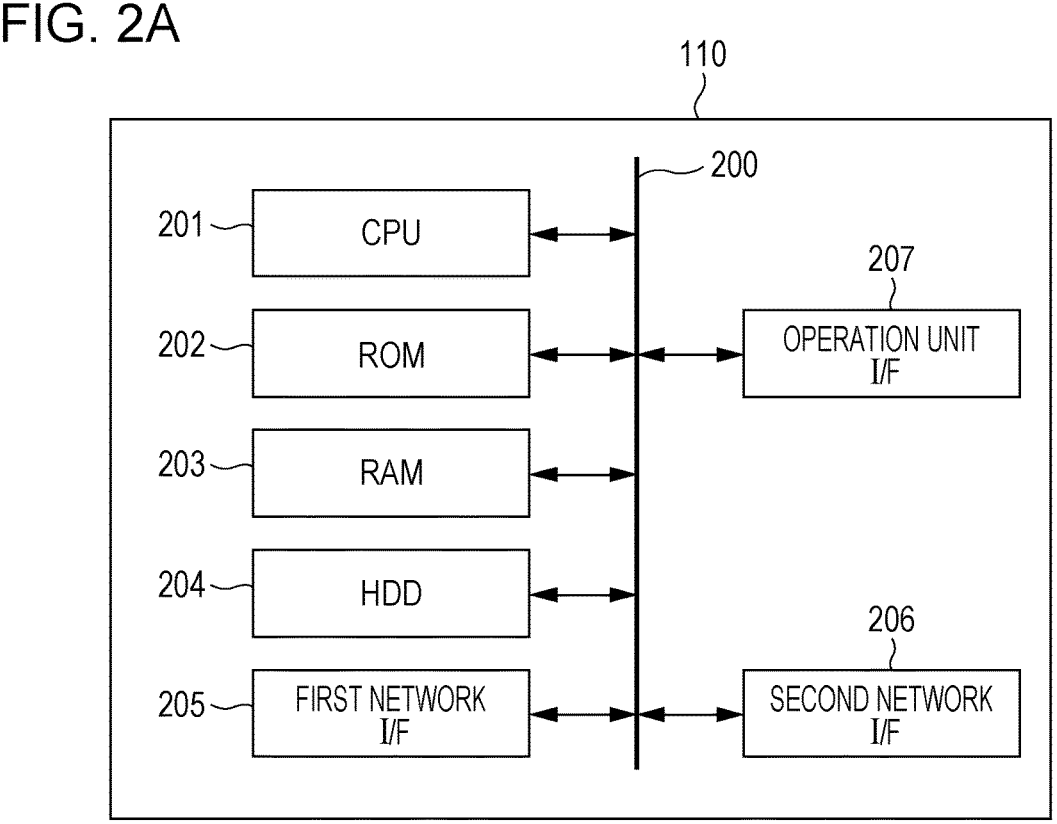
FIG. 2A is a diagram illustrating a hardware configuration in a first mode.
Figure 2B:
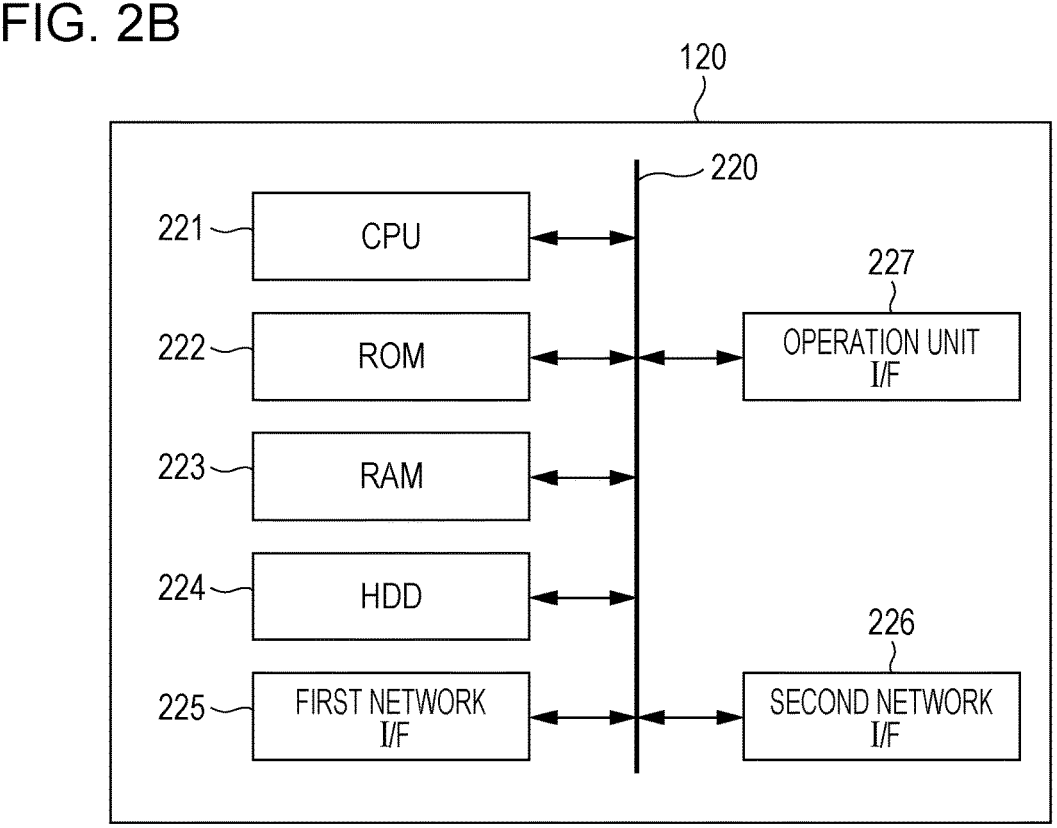
FIG. 2B is a diagram illustrating a hardware configuration in a second mode.

FIGS. 2A and 2B

Next, a hardware configuration according to this embodiment will be described.

FIG. 2A is a block diagram illustrating a hardware configuration of the MFP 110.

A central processing unit (CPU) 201 develops control programs stored in a read only memory (ROM) 202 or a hard disk drive (HDD) 204 in a random access memory (RAM) 203 and executes the developed programs to control access of various devices connected to a system bus 200 in an integrated manner. The ROM 202 stores control programs and the like to be executed by the CPU 201. The RAM 203 mainly functions as a main memory, a work area, and the like of the CPU 201, and memory capacity may be expanded by an optional RAM 203 that is connected to an expanded port not illustrated. The HDD 204 stores executable control programs, a boot program, various applications, font data, user files, edit files, setting data, and the like. Note that, although the HDD 204 is used in the first embodiment, any storage device, such as an SD card or a flash memory, may be used as long as stored content is not erased but maintained even after power is off. The same applies to an apparatus having a HDD described below. A first network interface (I/F) 205 is hardware of the port 102 connected to the DFE 120. Although, as illustrated in FIGS. 1A and 1B, the first network I/F 205 may be a network represented by 1 Gbit Ethernet or a high-speed communication line represented by HDMI or a USB, it is assumed that the first network I/F 205 corresponds to the network hereinafter. A second network I/F 206 is hardware of the port 103 of the network represented by 1 Gbit Ethernet connected to the network 100.

When switching between the configuration in FIG. 1A and the configuration in FIG. 1B is to be performed, both the hardware of the first network I/F 205 and the hardware of the second network I/F 206 are provided, a network cable is not connected to the second network I/F 206 in the configuration of FIG. 1A, and a network cable for the network 100 is connected to the second network I/F 206 in the configuration of FIG. 1B. Alternatively, when it is difficult to provide the two network ports in the hardware of the MFP 110, a conversion adapter is attached to an USB port, not illustrated, and the USB is connected to Ethernet so that the second network I/F 206 is formed. If the USB conversion adapter is not attached, the second network I/F 206 is not configured, and therefore, the configuration of FIG. 1A is employed. In this way, the hardware configuration illustrated in FIG. 2A attains both the configurations in FIGS. 1A and 1B.

FIG. 2B is a block diagram illustrating a hardware configuration of the DFE 120.

As with the MFP 110 in FIG. 2A, a CPU 221 develops control programs stored in a ROM 222 or a HDD 224 in a RAM 223 and executes the developed programs to control access of various devices connected to a system bus 220 in an integrated manner. The ROM 222 stores control programs or the like to be executed by the CPU 221. The RAM 223 mainly functions as a main memory, a work area, and the like of the CPU 221, and memory capacity may be expanded by an optional RAM 223 that is connected to an expanded port (not illustrated). The HDD 224 stores executable control programs, a boot program, various applications, font data, user files, edit files, setting data, and the like. Note that, although the HDD 224 is used in the first embodiment, any storage device, such as an SD card or a flash memory, may be used as long as stored content is not erased but maintained even after power is off. The same applies to an apparatus having an HDD described below. A first network I/F 225 is hardware of the port 104 connected to the MFP 110. Although, as illustrated in FIGS. 1A and 1B, the first network I/F 225 may be a network represented by 1 Gbit Ethernet or a high-speed communication line represented by HDMI or a USB, it is assumed that the first network I/F 225 corresponds to the network hereinafter. A second network I/F 226 is hardware of the port 105 of the network represented by 1 Gbit Ethernet connected to the network 100.

In either of the configurations in FIGS. 1A and 1B, the DFE 120 has the first network I/F 225 and the second network I/F 226, and in addition, is connected to both the MFP 110 and the network 100.

Figure 3A:
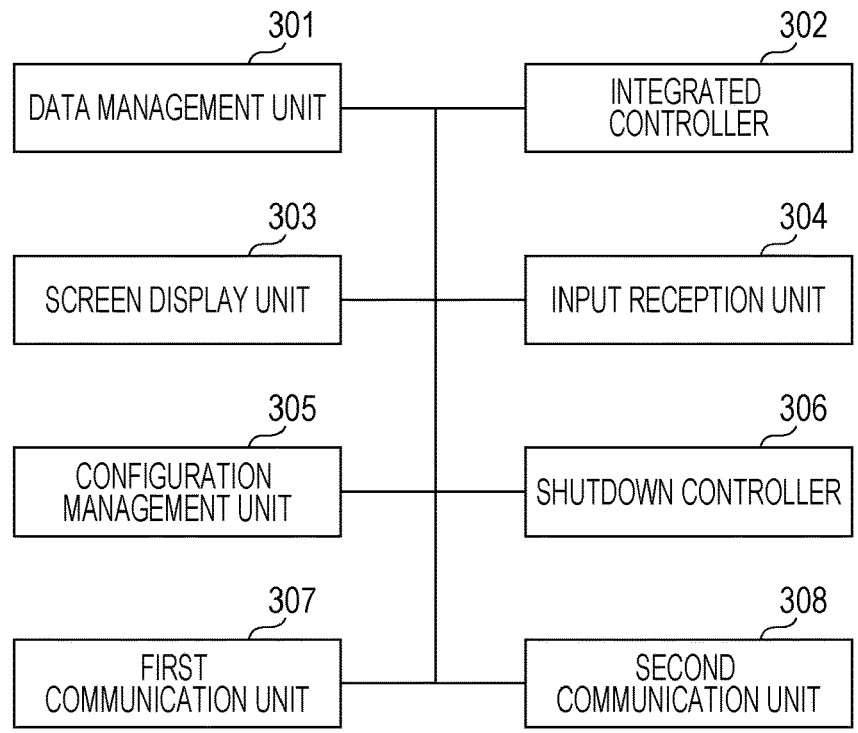
FIG. 3A is a diagram illustrating functional blocks in a first mode.
Figure 3B:
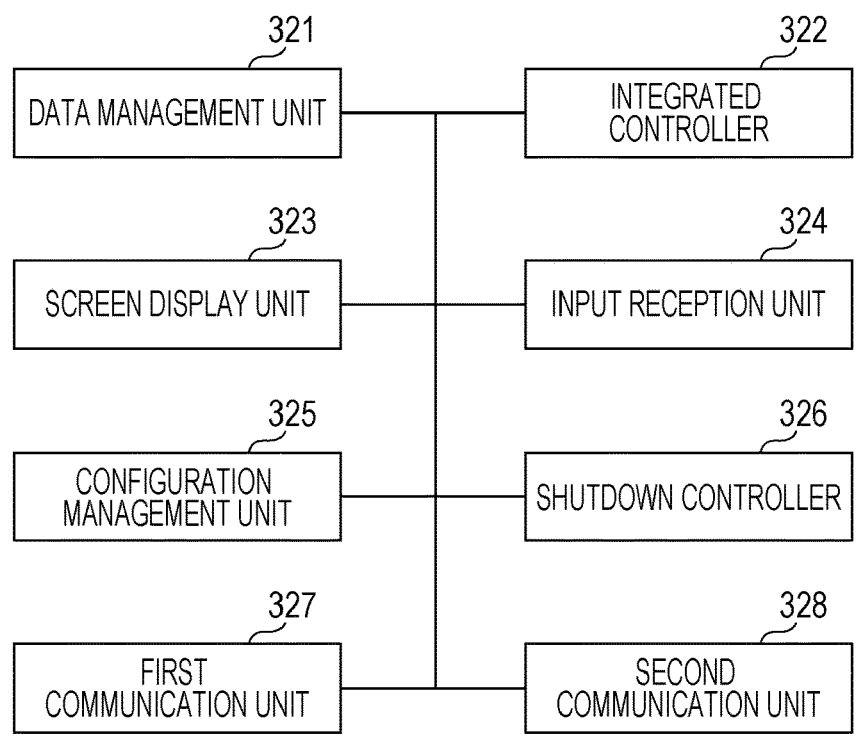
FIG. 3B is a diagram illustrating functional blocks in a second mode.

FIGS. 3A and 3B

A configuration of functional blocks of software according to this embodiment will now be described.

FIG. 3A is a block diagram illustrating functions of the MFP 110. The functions are realized when the CPU 201 reads programs stored in the ROM 202 or the HDD 204 and develops and executes the programs in the RAM 203.

A data management unit 301 manages various data, described below with reference to FIGS. 4A to 4E, stored in the HDD 204 or the RAM 203 by reading and writing the various data. A screen display unit 303 displays an operation menu and a state of the apparatus on a screen of the operation unit 111 of the MFP 110. An input reception unit 304 receives an instruction input by the operation unit 111 of the MFP 110. A configuration management unit 305 manages a connection configuration of the MFP 110 with the network 100 illustrated in FIGS. 1A and 1B. Specifically, the configuration management unit 305 manages whether the configuration of FIG. 1A or the configuration of FIG. 1B is employed. A shutdown controller 306 determines whether execution of shutdown is available when a shutdown instruction is issued to the MFP 110, and executes the shutdown when available. A first communication unit 307 and a second communication unit 308 control the communication processes using the first network I/F 205 and the second network I/F 206 illustrated with reference to FIG. 2A. The first communication unit 307 and the second communication unit 308 may control any of the first network I/F 205 and the second network I/F 206, but in this embodiment, it is assumed that the first communication unit 307 controls the first network I/F 205 connected to the DFE 120 and the second communication unit 308 controls the second network I/F 206 connected to the terminal 130. An integrated controller 302 cooperates with the units described above so as to control all the functions.

Note that, although a method for performing switching between the configurations in FIGS. 1A and 1B is described with reference to FIGS. 2A and 2B, the second communication unit 308 operates in the configuration of FIG. 1B but does not operate in the configuration of FIG. 1A.

FIG. 3B is a block diagram illustrating functions of the DFE 120. The functions are realized when the CPU 221 reads programs stored in the ROM 222 or the HDD 224 and develops and executes the programs in the RAM 223.

A data management unit 321 manages various data, described below with reference to FIGS. 4A to 4E, stored in the HDD 224 or the RAM 223 by reading and writing the various data. A screen display unit 323 displays an operation menu and a state of the apparatus on a screen of the operation unit 121 of the DFE 120. An input reception unit 324 receives an instruction input by the operation unit 121 of the DFE 120. A configuration management unit 325 manages a connection configuration of the DFE 120 with the network 100 illustrated in FIGS. 1A and 1B. Specifically, the configuration management unit 325 manages whether the configuration of FIG. 1A or the configuration of FIG. 1B is employed. A shutdown controller 326 determines whether execution of shutdown is available when a shutdown instruction is issued to the DFE 120, and executes the shutdown when available. A first communication unit 327 and a second communication unit 328 control the communication process using the first network I/F 225 and the second network I/F 226 illustrated with reference to FIG. 2B. The first communication unit 327 and the second communication unit 328 may control any of the first network I/F 225 and the second network I/F 226, but in this embodiment, it is assumed that the first communication unit 327 controls the first network I/F 225 connected to the DFE 120 and the second communication unit 328 controls the second network I/F 226 connected to the terminal 130. The integrated controller 322 cooperates with the units described above so as to control all the functions.

Note that, although a method for performing switching between the configurations in FIGS. 1A and 1B is described with reference to FIGS. 2A and 2B, the second communication unit 328 operates in both the configurations of FIGS. 1A and 1B.

FIGS. 4A to 4E

Various data according to this embodiment will now be described.

FIG. 4A is a diagram illustrating data stored in the HDD 204 in the MFP 110.

The data is realized when the CPU 201 reads programs stored in the ROM 202 or the HDD 204 and develops and executes the programs in the RAM 203.

Data 401 stores a value of a connection configuration of the MFP 110. In FIG. 4A, the data 401 is represented by XML data, but any table form or any form of configuration combination may be employed. The data 401 includes element content 403 sandwiched between a start tag 402 and an end tag 404. In FIG. 4A, a type X is described as the element content 403.

FIG. 4C is a table of types of connection configuration of the MFP 110. The table includes connection destinations of the first communication unit 307 and the second communication unit 308 of the MFP 110 described with reference to FIGS. 3A and 3B above. A type 1 indicates a connection configuration in which the first communication unit 307 is connected to the DFE 120 and the second communication unit 308 is connected to nothing. Specifically, the type 1 is the connection configuration described with reference to FIG. 1A. A type 2 indicates a connection configuration in which the first communication unit 307 is connected to the DFE 120 and the second communication unit 308 is connected to the network 100. Specifically, the type 2 is the connection configuration described with reference to FIG. 1B. Then the element content 403 of FIG. 4A is the type 1 or the type 2.

A method for inputting the type 1 or the type 2 in the element content 403 will now be described. A determination as to whether a setup is performed with the connection configuration in FIG. 1A or the connection configuration in FIG. 1B is made by the user by selecting one of the connection configurations depending on a usage as described in the background technique, and the user asks a service person to make such a setup. The service person appropriately configures the second network I/F 206 in the hardware configuration as described with reference to FIGS. 2A and 2B in accordance with the request of the user, and in addition, performs a setting of an item indicating the connection configuration in FIG. 1A or FIG. 1B in a service mode setting, not illustrated. When the MFP 110 is rebooted after the setting is performed, the system of the MFP 110 reads a setting value of the service mode setting item at the time of the activation and sets the type 1 or the type 2 in the element content 403. By this, the type 1 or the type 2 is input to the element content 403 of the data 401.

FIG. 4B is a diagram illustrating data stored in the HDD 224 of the DFE 120. The data is realized when the CPU 221 reads programs stored in the ROM 222 or the HDD 224 and develops and executes the programs in the RAM 223.

The data 421 stores a value of the connection configuration of the MFP 110, and the DFE 120 acquires a value of the element content 403 of the data 401 from the MFP 110 and inputs the value in the element content 423 of the data 421 as it is. Specifically, to acquire a type of the connection configuration of the MFP 110, the element content 423 of the data 421 that has been once acquired and input is simply referred to instead of the value of the element content 403 of the data 401 acquired each time from the MFP 110. The connection configuration of the MFP 110 is not switched during operation of the MFP 110 or the DFE 120, and specifically, is not switched once the service mode is set and reboot is performed. Therefore, the connection configuration is acquired once from the MFP 110 at a time of activation of the DFE. Note that a method of the acquisition is realized when a unique communication protocol is set and implemented between the MFP 110 and the DFE 120. For example, a command for requesting acquisition of a unique value and a reply for responding the value through the network 101 may be used.

FIG. 5

FIG. 5 is a sequence diagram of operations of the terminal 130 and the DFE 120 including an operation of the MFP 110 when the terminal 130 issues a remote shutdown instruction to the DFE 120. Note that a description is made to be suitable for both the connection configurations of FIGS. 1A and 1B. The operation of the MFP 110 in this sequence is realized when the CPU 201 reads the programs stored in the ROM 202 or the HDD 204 and develops and executes the programs in the RAM 203, and the operation of the DFE 120 is realized when the CPU 221 reads the programs stored in the ROM 222 or the HDD 224 and develops and executes the programs in the RAM 223.

First, the terminal 130 transmits a remote shutdown instruction to the DFE 120 (501). A plurality of concrete instruction methods may be realized. For example, a user operates an application for monitoring and controlling an apparatus on a network using Simple Network Management Protocol (SNMP) standardized as a network management protocol, and the application writes a value indicating execution to an object for performing shutdown (hereinafter referred to as a shutdown object) in a management information base (MIB) of the DFE 120 so as to issue the remote shutdown instruction to the DFE 120. Alternatively, a remote shutdown instruction may be issued to the DFE 120 by accessing a web service of the DFE 120 by a web browser of the terminal 130 and selecting and executing a shutdown instruction provided as a menu or a button of the web service. Furthermore, a remote shutdown instruction may be issued to the DFE 120 by selecting and executing a shutdown instruction provided as an operation menu or a button using a management application that is unique to the DFE 120 and that is used for monitoring and operating the DFE 120. Although the various instruction methods may be employed, the sequence described below may be realized by any of the methods. Note that it is assumed that an instruction method using SNMP is described hereinafter.

Subsequently, when receiving the instruction transmitted in 501, the DFE 120 transmits a remote shutdown instruction to the MFP 110 (502). Although this instruction may be performed by employing any of the methods described above, it is assumed that the instruction method using SNMP is employed hereinafter. When receiving the instruction in 502, the MFP 110 determines whether the MFP 110 may be shut down (503). This determination is realized by a flowchart of the MFP 110 illustrated below with reference to FIG. 6A, and the determination as to whether the MFP 110 may be shut down by itself is made in accordance with a connection configuration of the MFP 110. As a result, OK or an error is returned (504). Then the MFP 110 executes shutdown of the MFP 110 in accordance with a result of the determination (505). When receiving an OK or an error from the MFP 110, the DFE 120 returns, to the terminal 130 (506), OK when the response from the MFP 110 is OK whereas returns an error when the response is an error. Thereafter, the DFE 120 executes shutdown of the DFE 120 (507). When receiving the response from the DFE 120, the terminal 130 displays a result on a screen of the monitoring control application of SNMP (508).

Next, the operation of the DFE 120 in the remote shutdown sequence in FIG. 5 will be described with reference to a flowchart of FIG. 6B. The flowchart is realized when the CPU 221 reads a program stored in the ROM 222 or the HDD 224 and develops and executes the program in the RAM 223.

The DFE 120 starts the program when power is on (step 630, hereinafter, step is abbreviated as S). The second communication unit 328 of the DFE 120 monitors a communication reception, and when a communication is received, content of the communication is analyzed (S631). Specifically, the integrated controller 322 analyzes whether the transmission data supplied from the terminal 130 and received by the second communication unit 328 is a writing request for writing to the shutdown object based on the SNMP protocol. Then it is determined whether the communication received by the second communication unit 328 is a shutdown instruction supplied from the terminal 130 (S632), and when the result is Yes, the process proceeds to S633 and otherwise returns to S631 where the second communication unit 328 monitors a communication reception. When the process proceeds to S633, the DFE 120 transmits a shutdown instruction to the MFP 110 (S633). Specifically, the integrated controller 322 generates communication content of the writing request for writing to the shutdown object based on the SNMP protocol that is the shutdown instruction to the MFP 110, and the first communication unit 327 transmits the communication content to the MFP 110. In this case, an object ID of the shutdown object of the MFP 110 and a writing value for performing shutdown are implemented in a program in advance in the DFE 120, and therefore, the communication content based on the SNMP protocol is generated using the ID and the value. Subsequently, the DFE 120 monitors a communication reception by the first communication unit 327 of the DFE 120 and analyzes content of communication when receiving the communication (S634). It is determined whether the communication content is a response from the MFP 110 transmitted in response to the communication of the writing request for writing to the shutdown object based on the SNMP protocol (S635), and when the result is Yes, the process proceeds to S636 and otherwise returns to S635 where the first communication unit 327 monitors a communication reception again. Thereafter, the DFE 120 determines whether the communication content received by the first communication unit 327 is a response to the writing request for writing to the shutdown object based on the SNMP protocol transmitted in S633 (S635). Specifically, the integrated controller 322 analyzes the communication content received by the first communication unit 327, determines whether the communication content based on the SNMP protocol coincides with the object ID transmitted in S633, and when the result is Yes, it is determined that the communication content is a response to the request transmitted in S633. Subsequently, the DFE 120 acquires a value of OK or an error indicating a result of the writing request included in the response from the MFP 110 and temporarily stores the result value in the RAM 203 (S636). Specifically, the integrated controller 322 analyzes the communication content received by the first communication unit 327 and acquires a value of OK or an error included in a result about an object ID based on the SNMP protocol. Then the DFE 120 generates a response using the value of OK or an error acquired in S636 for the communication determined as the shutdown instruction supplied from the terminal 130 in S632 (S637). Specifically, the integrated controller 322 inputs the value of OK or an error temporarily stored in S636 in the response based on the SNMP protocol, generates communication content based on the SNMP protocol, and transmits the communication content from the second communication unit 328 to the terminal 130. Then the DFE 120 shuts down the DFE 120 itself (S638). Specifically, the integrated controller 322 performs control such that the shutdown controller 326 shuts down the DFE 120 itself. When the DFE 120 is shut down, the programs of the DFE 120 are terminated (S649).

By executing the flowchart described above, the process of the DFE 120 may be realized in the remote shutdown sequence illustrated in FIG. 5.

Next, operation of the MFP 110 in the remote shutdown sequence of FIG. 5 will be described with reference to a flowchart of FIG. 6A. The flowchart is realized when the CPU 201 reads a program stored in the ROM 202 or the HDD 204 and develops and executes the program in the RAM 203.

When the MFP 110 is powered, the program is started (S600). First, a connection configuration of the MFP 110 is checked (S601). Specifically, the integrated controller 302 accesses content of the data 401 described with reference to FIG. 4A managed by the configuration management unit 305 so as to acquire a value of the element content 403. Thereafter, the MFP 110 determines whether the acquired element content 403 is the type 1 or the type 2 (S602). When the element content 403 is the type 1 (Yes), the process proceeds to S603, and otherwise (No), the process proceeds to S613. Then the MFP 110 is configured such that the MFP 110 itself is shut down when receiving a shutdown instruction from the DFE 120 in S603 (S603). Specifically, the integrated controller 302 returns OK to a writing request when communication content of the SNMP protocol received from the DFE 120 by the first communication unit 307 is a writing request having a value indicating that shutdown is executed on the shutdown object of the MFP 110, and causes the shutdown controller 306 to issue an instruction for executing shutdown of the MFP 110 itself.

In S613, the MFP 110 is configured such that the MFP 110 itself is not shut down even when receiving a shutdown instruction from the DFE 120 (S613). Specifically, the integrated controller 302 returns an error to a writing request when communication content of the SNMP protocol received from the DFE 120 by the first communication unit 307 is the writing request having a value indicating that shutdown is executed on the shutdown object of the MFP 110, and causes the shutdown controller 306 not to issue an instruction for executing shutdown of the MFP 110 itself. Note that, when the integrated controller 302 returns an error to the writing request, the writing to the shutdown object is prohibited based on a specification of the SNMP protocol so that the shutdown controller 306 does not shut down the MFP 110 itself and an error is returned to the shutdown instruction. Furthermore, as illustrated in FIG. 5, a web service or a unique management application is employed as a method other than SNMP as described above with reference to FIG. 5. In either of the methods, the DFE 120 transmits a shutdown instruction through the network 101, the integrated controller 302 of the MFP 110 that has received the instruction configures the shutdown controller 306 such that shutdown is not executed, and an error is returned in response to the shutdown instruction. The process from S600 to S603 or S600 to S613 is executed immediately after activation of the MFP 110, and the MFP 110 is shut down or not shut down depending on whether the type 1 is employed when the shutdown instruction is received from the DFE 120.

After the process in S603 is performed, the MFP 110 checks a reception of the shutdown instruction supplied from the DFE 120 in S604 (S604). When the shutdown instruction is received (Yes in the determination in S605), the process proceeds to S606 whereas when the shutdown instruction is not received (No in the determination in S605), the process returns to S604 where the process is performed again. In S606, the MFP 110 returns OK to a writing request when communication content of the SNMP protocol received from the DFE 120 is a writing request having a value indicating that shutdown is executed on the shutdown object of the MFP 110, and issues an instruction for executing shutdown of the MFP 110 itself to the shutdown controller 306 so that the MFP 110 itself is shut down. Then the program of the MFP 110 is terminated (S629).

After the process in S613 is performed, the MFP 110 checks a reception of the shutdown instruction supplied from the DFE 120 in S614 (S614). When the shutdown instruction is received (Yes in the determination in S615), the process proceeds to S616 whereas when the shutdown instruction is not received (No in the determination in S615), the process returns to S614 where the process is performed again. In S616, the MFP 110 returns an error to a writing request when communication content of the SNMP protocol received from the DFE 120 is a writing request having a value indicating that shutdown is executed on the shutdown object of the MFP 110, and does not issue an instruction for executing shutdown of the MFP 110 itself to the shutdown controller 306. Then the process returns to S614, and the process is performed again. Specifically, the flowchart of FIG. 6A is continued until the MFP 110 is shut down by another method.

According to the description above, when a remote shutdown instruction is issued to the DFE 120, the MFP 110 may appropriately determine whether the MFP 110 itself is to be shut down in accordance with a connection configuration of the MFP 110.

Note that, although it is assumed in this embodiment that the remote shutdown instruction is issued, an instruction for entering a sleep state may be issued. In this case, this method may be realized when a function of the shutdown controller 306 is expanded so that not only the shutdown control but also sleep control may be performed. Note that there may be a plurality of combinations of a power consumption amount and a period of time required for performing switching from a sleep state to a printable state as a sleep state. The combinations correspond to variations of a standby state, a sleep state, and a deep sleep state in general. This idea may be realized in any of the combinations. Note that the program of the MFP 110 is not terminated even in the sleep state, and therefore, after the process in S606 in the flowchart of FIG. 6A, the process returns to S604 after restoration from the sleep state instead of the process in S629 where the process is terminated. Furthermore, although both the shutdown state and the sleep state are equally in a state in which used power or supplied power is reduced, a larger amount of the used power or the supplied power is reduced in the shutdown state than the sleep state. Specifically, when compared with the sleep state, power supply to a larger number of components included in the MFP 110 is stopped in the shutdown state.

In the first example, when a remote shutdown instruction is issued to the DFE 120, the MFP 110 determines whether the MFP 110 itself is to be shut down in accordance with a connection configuration of the MFP 110 as an example.

As a second example, a case where the DFE 120 makes the determination will be described.

FIG. 1A to FIG. 4C are the same as those of the first example.

Figure 6A:
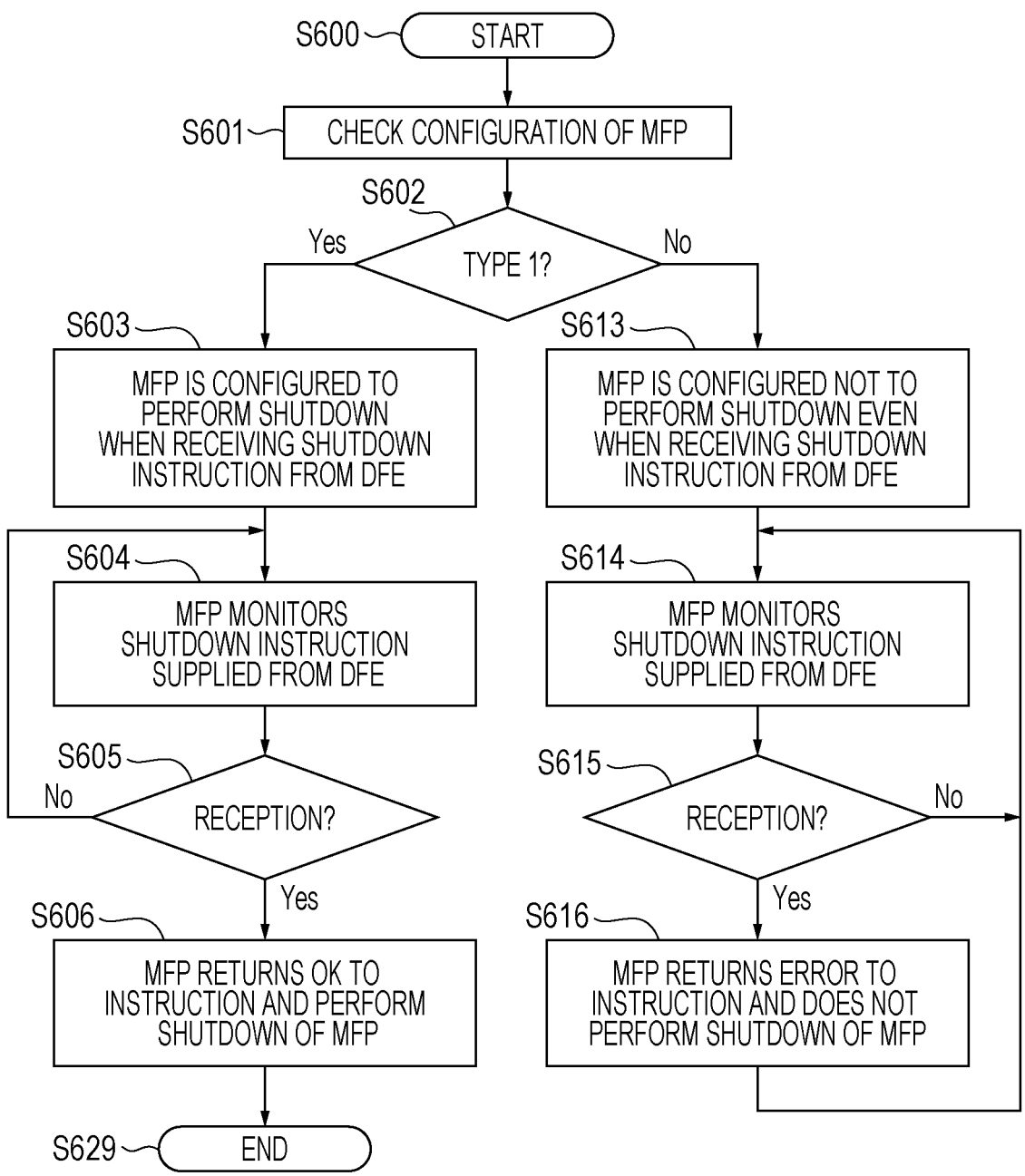
FIG. 6A is a flowchart in a first mode.
Figure 6C:
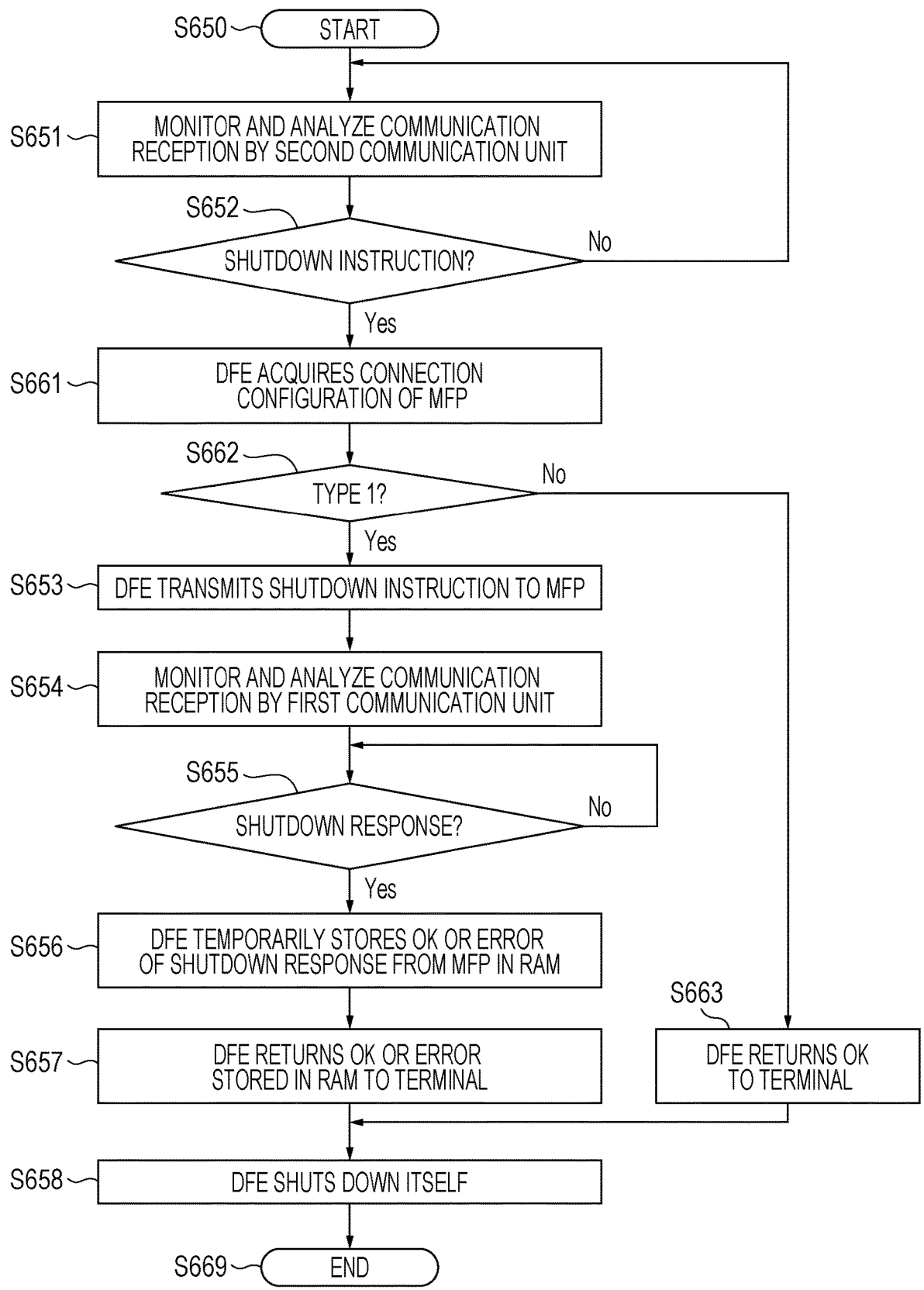
FIG. 6C is a flowchart in a third mode.

FIG. 6C is a flowchart of the DFE 120 in the second example. The flowchart is realized when the CPU 221 reads a program stored in the ROM 222 or the HDD 224 and develops and executes the program in the RAM 223.

First, a process from S650 to S658 in the flowchart of FIG. 6C is the same as the process from S630 to S638 in the flowchart of FIG. 6B.

When the DFE 120 is powered, the program is started (S650). The second communication unit 328 of the DFE 120 monitors a communication reception, and when a communication is received, content of the communication is analyzed (S651). Specifically, the integrated controller 322 analyzes whether transmission data supplied from the terminal 130 and received by the second communication unit 328 is a writing request for writing to the shutdown object based on the SNMP protocol. Then it is determined whether the communication received by the second communication unit 328 is a shutdown instruction supplied from the terminal 130 (S652), and when the result is Yes, the process proceeds to S661 and otherwise returns to S651 where the second communication unit 328 monitors a communication reception again. When the process proceeds to S661, the DFE 120 acquires a connection configuration of the MFP 110 (S661). Specifically, as described with reference to the data 421 of FIG. 4B, the integrated controller 322 of the DFE 120 acquires the data 401 of the MFP 110 at a time of activation from the integrated controller 302 of the MFP 110 through the first communication unit 327 and stores the data 401 in the data 421. Thereafter, the integrated controller 322 acquires the data 421 managed by the data management unit 321 from the data management unit 321. The integrated controller 322 may acquire the connection configuration of the MFP 110 with reference to the data 421.

Next, the DFE 120 determines whether the acquired data 421 is the type 1 (S662). When the data 421 is the type 1 (Yes), the process proceeds to S653, and otherwise (No), the process proceeds to S663. When the process proceeds to S653, the DFE 120 transmits a shutdown instruction to the MFP 110 (S653). Specifically, the integrated controller 322 generates communication content of the writing request for writing to the shutdown object based on the SNMP protocol that is the shutdown instruction to the MFP 110, and the first communication unit 327 transmits the communication content to the MFP 110. In this case, an object ID of the shutdown object of the MFP 110 and a writing value for performing shutdown are implemented in a program in advance in the DFE 120, and therefore, the communication content based on the SNMP protocol is generated using the ID and the value. Subsequently, the DFE 120 monitors a communication reception in the first communication unit 327 of the DFE 120 and analyzes content of communication when receiving the communication (S654). It is determined whether the communication content is a response from the MFP 110 transmitted in response to the communication of the request for writing to the shutdown object based on the SNMP protocol (S655), and when the result is Yes, the process proceeds to S656 and otherwise returns to S655 where the first communication unit 327 monitors a communication reception again. Thereafter, the DFE 120 determines whether the communication content received by the first communication unit 327 is a response to the writing request for writing to the shutdown object based on the SNMP protocol transmitted in S653 (S655). Specifically, the integrated controller 322 analyzes the communication content received by the first communication unit 327 and determines whether the communication content is based on the SNMP protocol and coincides with the object ID transmitted in S653, and when the result is Yes, it is determined that the communication content is a response to the request transmitted in S653. Subsequently, the DFE 120 acquires a value of OK or an error indicating a result of the writing request included in the response from the MFP 110 and temporarily stores the resultant value in the RAM 203 (S656). Specifically, the integrated controller 322 analyzes the communication content received by the first communication unit 327 and acquires a value of OK or an error included in a result about an object ID based on the SNMP protocol. Then the DFE 120 generates a response using the value of OK or an error acquired in S656 for the communication determined as the shutdown instruction supplied from the terminal 130 in S652 (S657). Specifically, the integrated controller 322 inputs the value of OK or an error temporarily stored in S656 in the response based on the SNMP protocol, generates communication content based on the SNMP protocol, and transmits the communication content from the second communication unit 328 to the terminal 130. Then the DFE 120 shuts down the DFE 120 itself (S658). Specifically, the integrated controller 322 performs control such that the shutdown controller 326 shuts down the DFE 120 itself.

When the result is No in S662 and therefore the process proceeds to S663, the DFE 120 returns OK to the terminal 130 that has issued the remote shutdown instruction and the process proceeds to S658. Accordingly, when the connection configuration of the MFP 110 is not the type 1, the DFE 120 does not issue a shutdown instruction to the MFP 110 and only shuts down the DFE 120. When the DFE 120 is shut down, the programs of the DFE 120 are terminated (S669). Needless to say, when the process in S663 is performed and the DFE 120 does not issue the shutdown instruction to the MFP 110, although the flowchart of the MFP 110 described with reference to FIG. 6A is executed, the determinations in S605 and S615 are always No, and therefore, the process does not proceed to S606 and S616, respectively, since the shutdown instruction is not supplied from the DFE 120.

According to the description above, when a remote shutdown instruction is issued to the DFE 120, the DFE 120 determines whether the MFP 110 is to be shut down in accordance with a connection configuration of the MFP 110.

According to the first and second examples, a method has been described in which, when a remote shutdown instruction is issued to the DFE 120, switching between shutdown of the DFE 120 with the MFP 110 performed by the MFP 110 or the DFE 120 and shutdown of only the DFE 120 is performed depending on a connection configuration of the MFP 110.

In a third example, a case where a connection configuration of the MFP 110 is the type 2, modes of shutdown are set to the MFP 110 or the DFE 120 separately from the connection configuration, and switching is performed in accordance with a mode will be described. Hereinafter, a mode in which not only the DFE 120 but also the MFP 110 is shut down is referred to as a together mode, and a mode in which only the MFP 110 or the DFE 120 is shut down is referred to as a solo mode.

FIG. 1A to FIG. 3B are the same as those of the first example.

Figure 4D:
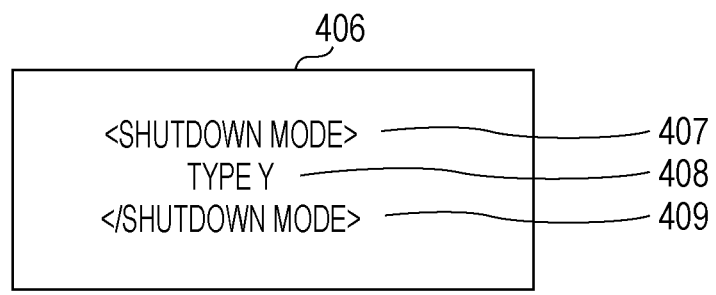
FIG. 4D is a diagram illustrating fourth type setting data.

FIG. 4D is a diagram illustrating data stored in the HDD 204 included in the MFP 110.

The data is realized when the CPU 201 reads programs stored in the ROM 202 or the HDD 204 and develops and executes the programs in the RAM 203.

The data 406 stores a value of a shutdown mode of the MFP 110. In FIG. 4D, the data 406 is represented by XML data, but any table form or any form of configuration combination may be employed. The data 406 includes element content 408 sandwiched between a start tag 407 and an end tag 409.

In FIG. 4D, a type Y is described as the element content 408. A value corresponding to the together mode or the solo mode set in a setting screen described below is input as a value of the element content 408. Note that the type 1 is set when the together mode is set whereas the type 2 is set when the solo mode is set. The same process is performed as the case of the type 1 and the type 2 of the connection configuration of the MFP 110 described in the first and second examples, and therefore, a description will be made by inputting the same value, i.e., the type 1 and the type 2.

Figure 4E:
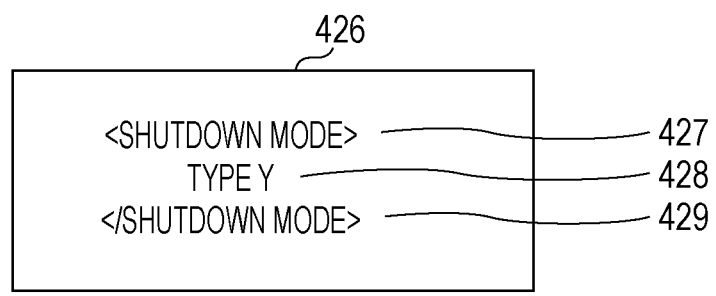
FIG. 4E is a diagram illustrating fifth type setting data.

FIG. 4E is a diagram illustrating data stored in the HDD 224 in the DFE 120. The data is realized when the CPU 221 reads programs stored in the ROM 222 or the HDD 224 and develops and executes the programs in the RAM 223.

Data 426 stores a value of the shutdown mode of the MFP 110. In FIG. 4E, the data 426 is represented by XML data, but any table form or any form of configuration combination may be employed. The data 426 includes element content 428 sandwiched between a start tag 427 and an end tag 429.

In FIG. 4E, a type Y is described as the element content 428. As a value of the element content 428, as with the element content 423 of the data 421, a value of the element content 408 may be acquired from the MFP 110 and stored in the element content 428. Alternatively, as with the element content 408, a value corresponding to the together mode or the solo mode set in the setting screen may be input.

Figure 7A:
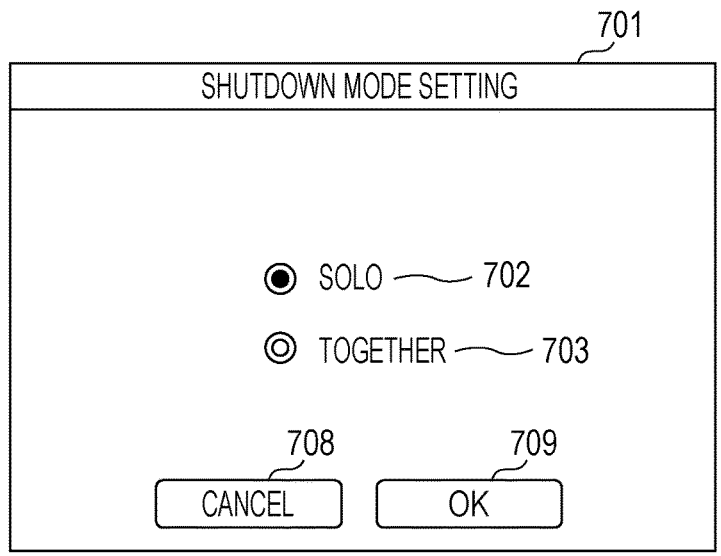
FIG. 7A is a diagram illustrating a first setting screen.

FIG. 7A is a diagram illustrating the setting screen for a shutdown mode of the MFP 110. The screen is realized when the CPU 201 reads programs stored in the ROM 202 or the HDD 204 and develops and executes the programs in the RAM 203.

The integrated controller 302 of the MFP 110 causes the screen display unit 303 to display the setting screen illustrated in FIG. 7A, and the integrated controller 302 accepts an instruction input by the user on the setting screen through the input reception unit 304.

FIG. 7A is a diagram illustrating a shutdown mode setting screen 701 displayed on the operation unit 111 of the MFP 110. In this screen, a solo mode 702 and a together mode 703 are displayed as options in a radio button form so that one of the solo mode 702 and the together mode 703 may be selected. The user selects one of the solo mode 702 and the together mode 703, and thereafter, presses an OK button 709. When a wrong option is selected or setting is not performed, the user presses a cancel button 708.

When the setting screen is closed by a press of the OK button 709, the integrated controller 302 acquires the solo mode or the together mode through the input reception unit 304, and inputs the type 2 when the solo mode 702 is acquired and inputs the type 1 when the together mode 703 is acquired in the element content 408 of the data 406. Furthermore, the integrated controller 302 of the MFP 110 transmits, to the DFE 120 through the first communication unit 307, the fact that the shutdown mode setting has been input, and the integrated controller 322 of the DFE 120 acquires the value to be input to the element content 428 of the data 426 of the DFE 120. Note that the DFE 120 may have the setting screen 701, and a value set in the DFE 120 may be transmitted to the MFP 110 so as to be input to the element content 408. Furthermore, the MFP 110 and the DFE 120 may have respective setting screens, and setting values may be input to the element content 408 and the element content 428 of the setting screens.

Thereafter, when a value is input to the element content 408, the integrated controller 302 of the MFP 110 writes the value to the element content 403 as overwriting. Accordingly, the value of the shutdown mode setting is more preferential than the connection configuration. Furthermore, as described above, the element content 423 of the data 421 of the DFE 120 is overwritten with an obtained value of the element content 403.

According to the process above, the user performs a shutdown mode setting of the MFP 110 and the DFE 120 using the setting screen and the setting value has higher priority than the connection configuration of the MFP 110.

Next, processes of the MFP 110 and the DFE 120 in the shutdown mode will be described. Also in this case, FIG. 5 and FIG. 6A to FIG. 6C are used for the description.

As described above, when the together mode 703 is set in the shutdown mode setting, the element content 408 is the type 1, whereas when the solo mode 702 is set, the element content 408 is the type 2.

Then the sequence illustrated in FIG. 5 and the operations of the MFP 110 and the DFE 120 described with reference to FIGS. 6A and 6B are the same as those in a case where the connection configuration is the type 1 as illustrated in FIG. 4C when the together mode 703 is set in the shutdown mode setting and are the same as those in a case where the connection configuration is the type 2 as illustrated in FIG. 4C when the solo mode 702 is set. Furthermore, as illustrated in FIG. 6C, operations performed when the DFE 120 determines whether the MFP 110 is to be shut down in accordance with a shutdown mode setting are also the same as those in a case where the connection configuration of FIG. 4C is the type 1 when the together mode 703 is set in the shutdown mode setting and are the same as those in a case where the connection configuration of FIG. 4C is the type 2 when the solo mode 702 is set.

To wrap up, when the shutdown mode setting is performed while the connection configuration of the MFP 110 is the type 2, the shutdown mode has higher priority than the connection configuration.

When the together mode 703 is set as the shutdown mode, the MFP 110 and the DFE 120 are shut down together, whereas when the solo mode 702 is set, only the DFE 120 is shut down. As described above, also when the shutdown mode is set, an appropriate process of determining whether the MFP 110 is to be shut down in accordance with a mode may be realized.

In the first to third examples, the method has been described in which the MFP 110 or the DFE 120 appropriately determines whether the MFP 110 is to be shut down in accordance with the connection configuration of the MFP 110 or a setting of the shutdown mode in response to a remote shutdown instruction issued by the terminal 130.

A fourth example describes a method in which the terminal 130 appropriately determines whether to shut down the MFP 110.

As described with reference to FIG. 5, the terminal 130 issues a remote shutdown instruction to the DFE 120 by SNMP, a web service, or a unique management application.

Figure 7B:
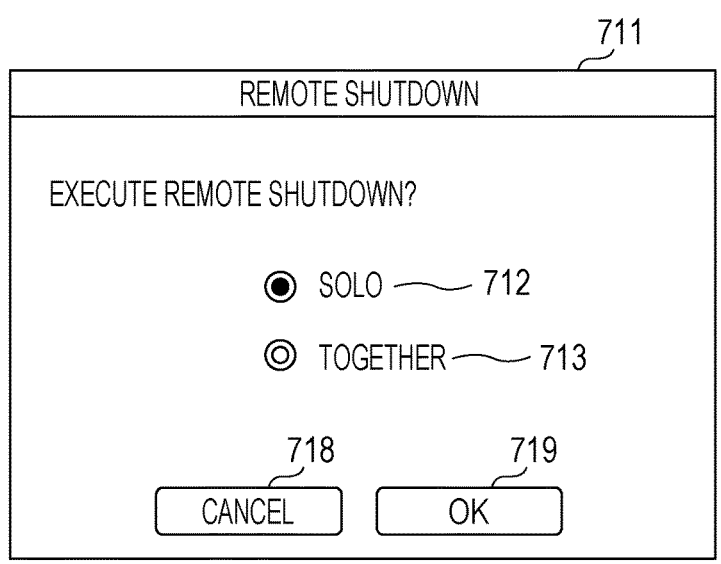
FIG. 7B is a diagram illustrating a second setting screen.

FIG. 7B is a diagram illustrating a screen 711 for issuing a remote shutdown instruction displayed in the terminal 130. In the screen 711, a shutdown instruction may be issued to the DFE 120 by pressing an OK button 719 after a solo mode 713 or a together mode 713 is specified as a shutdown mode. Note that a shutdown instruction is not issued when a cancel button 718 is pressed. At this time, the solo mode 712 or the together mode 713 is selected in accordance with a type of the connection configuration of the MFP 110 in the first and second examples and the shutdown mode in the third example. In the terminal 130, SNMP or the unique management application communicates with the DFE 120 so as to acquire the element content 423 of the data 421 or the element content 428 of the data 426 and reflects the acquired content to a selection of one of radio buttons of the solo mode 712 and the together mode 713 on the screen 711 of the terminal 130. In the web service, since the DFE 120 generates the screen 711, the screen 711 is displayed when screen data is generated including values of the element content 423 and the element content 428. Therefore, when the shutdown screen 711 is opened, an existing setting value of the element content 423 or the element content 428 of the DFE 120 is acquired and displayed on the screen 711, but when shutdown is performed by selecting a button different from the radio button of the solo mode 712 or the together mode 713 being displayed on the screen 711, a selected value is transmitted to the DFE 120.

The DFE 120 that has received the remote shutdown instruction from the terminal 130 overwrites the existing setting values of the element content 423 and the element content 428 when receiving a setting value of the solo mode or the together mode with the shutdown instruction. Then a shutdown process is started. As the shutdown process, the flowcharts of FIGS. 6A and 6B or the flowcharts of FIGS. 6A and 6C are executed.

According to the description above, the following process may be realized. That is, after selecting the solo mode or the together mode, the terminal 130 transmits a remote shutdown instruction to the DFE 120 and a determination as to whether the MFP 110 is to be shut down may be appropriately made in accordance with a mode.

The case where a remote shutdown instruction is transmitted from the terminal 130 is described in the first to fourth examples.

In a fifth example, a case where a shutdown instruction is issued by the operation unit included in the MFP 110 or in the DFE 120 will be described.

As illustrated in FIG. 1, the MFP 110 includes the operation unit 111 and the DFE 120 includes the operation unit 121. Each of the operation units has a function of shutting down the apparatus.

Specifically, the MFP 110 is shut down when a shutdown instruction is issued by the operation unit 111 whereas the DFE 120 is shut down when a shutdown instruction is issued by the operation unit 121. As a shutdown instruction from the operation unit, a process of performing shutdown by selecting a solo mode or a together mode, as with the remote shutdown instruction described above, will be described.

Figure 7C:
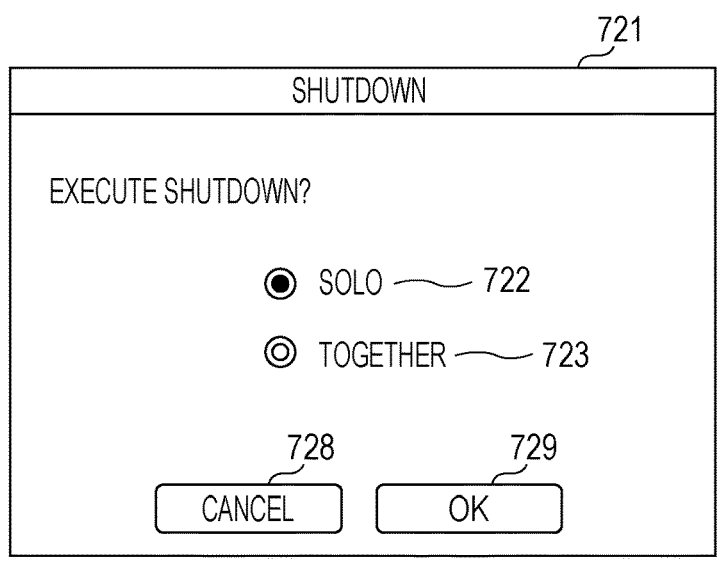
FIG. 7C is a diagram illustrating a third setting screen.

Operation screens of the operation unit 111 and the operation unit 121 are illustrated in FIG. 7C. Hereinafter, an operation screen of the operation unit 121 of the DFE 120 will be described. On this screen 721, a shutdown instruction may be issued to the DFE 120 by pressing an OK button 729 after a solo mode 722 or a together mode 723 is specified as a shutdown mode. Note that a shutdown instruction is not issued when a cancel button 728 is pressed. At this time, the solo mode 722 or the together mode 723 is selected in accordance with a type of the connection configuration of the MFP 110 in the first and second examples and the shutdown mode in the third example. The integrated controller 322 of the DFE 120 acquires the element content 423 of the data 421 and the element content 428 of the data 426 so as to reflect the selected content to a selection of a radio button of the solo mode 722 or the together mode 723 on the screen 721. Therefore, when the shutdown screen 721 is opened, an existing setting value of the element content 423 or the element content 428 of the DFE 120 is acquired and displayed on the screen 721, and when shutdown is performed by selecting a button different from the radio button of the solo mode 722 or the together mode 723 being displayed on the screen 721, the integrated controller 322 of the DFE 120 overwrites the element content 423 of the data 421 or the element content 428 of the data 426 by the selected value and shutdown is started. As the shutdown process, the flowcharts of FIGS. 6A and 6B or the flowcharts of FIGS. 6A and 6C are executed.

Note that the operation unit 111 of the MFP 110 has the same configuration.

According to the description above, even when a shutdown instruction is issued after the operation unit 111 or the operation unit 121 selects a solo mode or a together mode, a determination as to whether the MFP 110 is to be shut down may be appropriately made depending on a mode.

Other Examples

The present disclosure may be realized by a process of supplying a program that realizes at least one function of the foregoing embodiment to a system or an apparatus through a network or a storage medium and reading and executing, by at least one processor of a computer included in the system of the apparatus, the program. Furthermore, the present disclosure may be realized by a circuit that realizes at least one function (application specific integrated circuit (ASIC), for example).

As described above, an apparatus may be appropriately shut down in response to a remote shutdown instruction in accordance with a connection configuration between a printer or a multifunction peripheral and a print controller.

Other Embodiments

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-157491, which was filed on Sep. 28, 2021 and which is hereby incorporated by reference herein in its entirety.

What is claimed is:

1. An image control apparatus connected to an image forming apparatus through a network, wherein one or more terminals are directly connected to the image forming apparatus or the one or more terminals are communicably connected to the image forming apparatus through the image control apparatus, the image control apparatus comprising:
one or more controllers having one or more processors and one or more memories, the one or more controllers being configured:
to receive, from a first terminal included in the one or more terminals through a network, a shutdown instruction issued to the image forming apparatus; and
to determine whether the image forming apparatus is connected to a second network other than a first network through which the image forming apparatus is connected to the image control apparatus, wherein
in case where the one or more controllers determine that the image forming apparatus is connected to the second network other than the first network through which the image forming apparatus is connected to the image control apparatus, the one or more controllers do not issue the shutdown instruction to the image forming apparatus even when the one or more controllers receive the shutdown instruction through the network.

2. The image control apparatus according to claim 1, wherein the one or more controllers are further configured:
to issue the shutdown instruction to the image forming apparatus in response to a reception of the shutdown instruction through the network, in case where the one or more controllers determine that the image forming apparatus is not connected to the second network other than the first network through which the image forming apparatus is connected to the image control apparatus.

3. The image control apparatus according to claim 2, wherein the one or more controllers are further configured:
to receive, from the image forming apparatus, information indicating that the image forming apparatus performs shutdown in response to the shutdown instruction.

4. The image control apparatus according to claim 3, wherein the one or more controllers are further configured:
to shut down the image control apparatus in response to a reception of the information.

5. The image control apparatus according to claim 1, wherein the one or more controllers are further configured:
to include a first setting and a second setting, the first setting determining whether the shutdown instruction is to be issued to the image forming apparatus in accordance with whether the image forming apparatus is connected to the second network other than the first network through which the image forming apparatus is connected to the image control apparatus, the second setting issuing the shutdown instruction to the image forming apparatus irrespective of whether the image forming apparatus is connected to the second network other than the first network through which the image forming apparatus is connected to the image control apparatus.

6. The image control apparatus according to claim 1, wherein the network is an ethernet.

7. The image control apparatus according to claim 1, wherein the network is an intranet.

8. The image control apparatus according to claim 1, wherein the one or more terminals are configured to be able to use a function of the image forming apparatus thorough the second network.

9. The image control apparatus according to claim 8, wherein the function of the image forming apparatus, which is used thorough the second network, includes a scanning function and a BOX function.

10. The image control apparatus according to claim 1, wherein the one or more terminals are configured to be able to use a function of the image forming apparatus thorough the image control apparatus.

11. The image control apparatus according to claim 10, wherein the function of the image forming apparatus, which is used thorough the image control apparatus, includes a printing function.

12. A method for controlling an image control apparatus connected to an image forming apparatus through a network, wherein one or more terminals are directly connected to the image forming apparatus or a one or more terminals are connected to the image forming apparatus through the image control apparatus, the method comprising:
receiving, from a first terminal included in the one or more terminals through a network, a shutdown instruction issued to the image forming apparatus; and
determining whether the image forming apparatus is connected to a second network other than a first network through which the image forming apparatus is connected to the image control apparatus, wherein
in case where it is determined that the image forming apparatus is connected to the second network other than the first network through which the image forming apparatus is connected to the image control apparatus, the shutdown instruction is not issued to the image forming apparatus even when the shutdown instruction is received through the network.

13. The method for controlling an image control apparatus according to claim 12, the method further comprising issuing the shutdown instruction to the image forming apparatus in response to a reception of the shutdown instruction through the network, in case where it is determined that the image forming apparatus is not connected to the second network other than the first network through which the image forming apparatus is connected to the image control apparatus.

14. The method for controlling an image control apparatus according to claim 13, the method further comprising receiving, from the image forming apparatus, information indicating that the image forming apparatus performs shutdown in response to the shutdown instruction in the issuing the shutdown instruction.

15. The method for controlling an image control apparatus according to claim 14, the method further comprising shutting down the image control apparatus in response to a reception of the information in the receiving the information.

16. The method for controlling an image control apparatus according to claim 12, wherein control is performed based on a first setting and a second setting, the first setting determining whether the shutdown instruction is to be issued to the image forming apparatus in accordance with whether the image forming apparatus is connected to the second network other than the first network connected to the image control apparatus through which the image forming apparatus is connected to the image control apparatus, the second setting issuing the shutdown instruction to the image forming apparatus irrespective of whether the image forming apparatus is connected to the second network other than the first network through which the image forming apparatus is connected to the image control apparatus.

* * * * *